Figure 1:
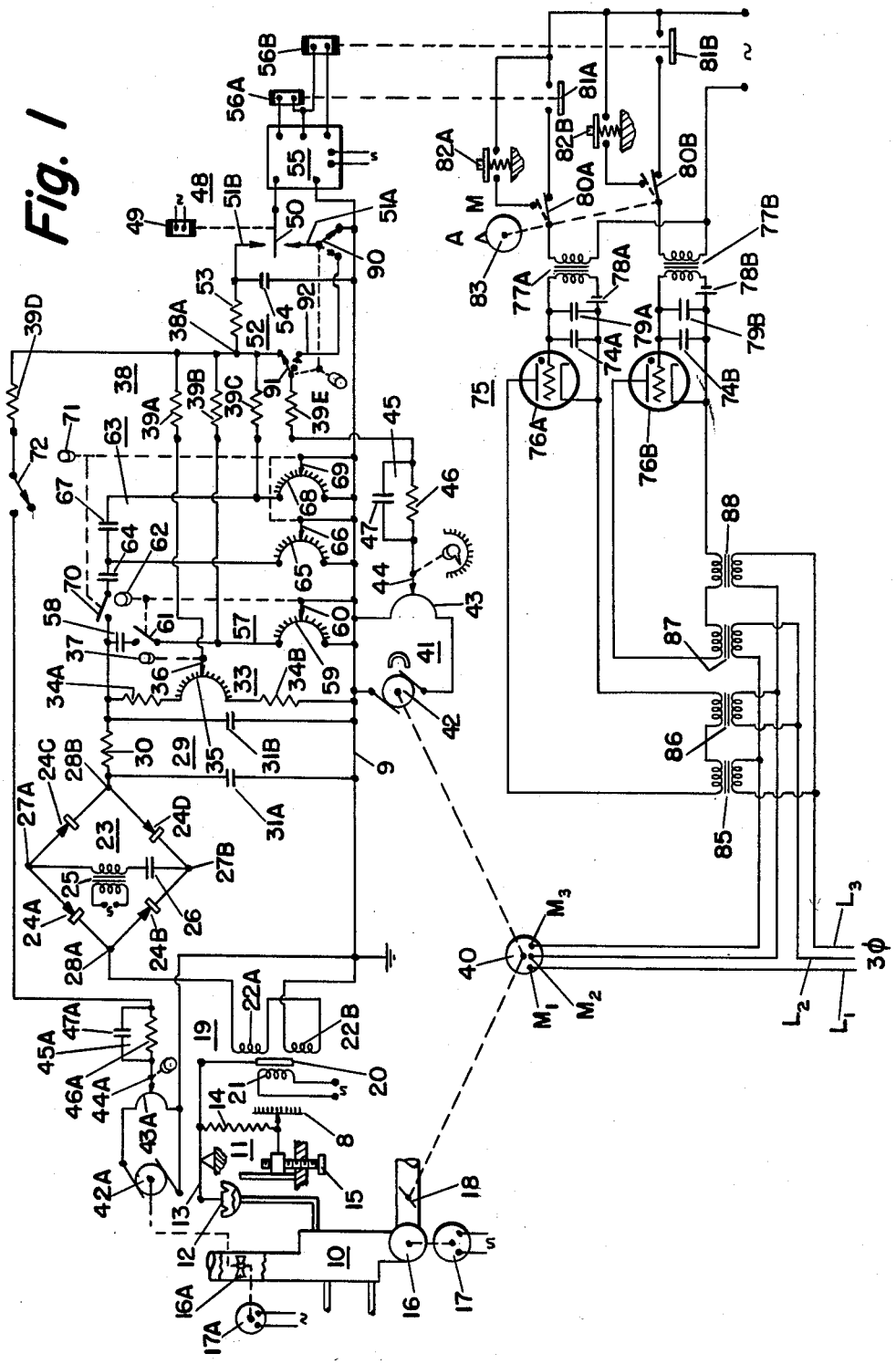

3,171,070
ELECTRONIC CONTROLLED MOTOR SYSTEM
FOR PROCESS CONTROL

Harold A. List, Ambler, and Willem H. Van Aller, Oreland, Pa., assignors to Leeds and Northrup Company, Philadelphia, Pa., a corporation of Pennsylvania
Filed Feb. 5, 1960, Ser. No. 6,920
2 Claims. (Cl. 318—28)

This invention relates to electronic control systems, and particularly to systems in which a final control element, such as a valve, is adjusted in response to changes in magnitude of a process variable, such as pressure, temperature or other condition.

In the conventional control systems previously used, the deviation of the process variable from its desired value or set point was utilized to provide the input signal to a controller which moved the final control element to a position corresponding with the sense and magnitude of the deviation. Some of these control systems also included provisions to shift or re-set the final control element if the deviation persisted. Some of these control systems also included provisions to provide motion of the final control element proportional to the rate of change of the deviation of the process variable.

In accordance with the present invention, the basic input to the controller is the resultant of a signal corresponding with the deviation from the selected set point of the process variable and a feedback signal proportional to the speed of the final control element. The final control element thus moves in direction determined by the sense of the deviation, at a speed proportional to the magnitude of the deviation and comes to rest in whatever position it may have when the deviation signal becomes zero. For taking care of processes having a substantial lag, it is additionally provided that the input to the controller may also include, by differentiation of the deviation signal, a second control signal corresponding with the speed at which the process variable is approaching or departing from the set point. The resultant of this signal and the feedback signal provides a speed or rate of change of the final control element which is proportional to the speed or rate of change of the deviation. For situations in which the process lag is unusually long, it is provided that the input to the controller may also include, by double-differentiation of the deviation signal, a signal corresponding with the acceleration of the deviation with respect to the set point. The resultant of this signal and the aforesaid feedback signal provides a speed of adjustment of the final control element which is proportional to the deviation acceleration.

More specifically, the deviation signal and the feedback signal are combined, with optional inclusion of the deviation-speed signal and/or the deviation-acceleration signal, in a summing or averaging device or network to provide the input signal of an amplifier which controls the direction and speed of rotation of an actuating motor for the final control element.

Further and more specifically, the deviation of a process variable from a selected set point is first converted to an A.C. signal of corresponding phase and magnitude. Such A.C. signal is then converted by a demodulator into a D.C. signal of corresponding polarity and magnitude for combination with a D.C. feedback signal proportional to the speed of the driving motor of the final control element.

More specifically, the driving motor may be a reversible three-terminal A.C. motor whose connections to an A.C. power source include the primary windings of saturable core transformers or reactors having secondary windings in the output circuits of thyratrons or equivalent rectifying devices. In response to selective control of the thyratrons, the resulting flow of direct current in the associated secondary winding unbalances the reactances of the primary windings and effects energization of the motor in sense corresponding with the selected control.

The invention further resides in electronic control systems having features of combination and arrangement hereinafter described and claimed.

Figure 2:
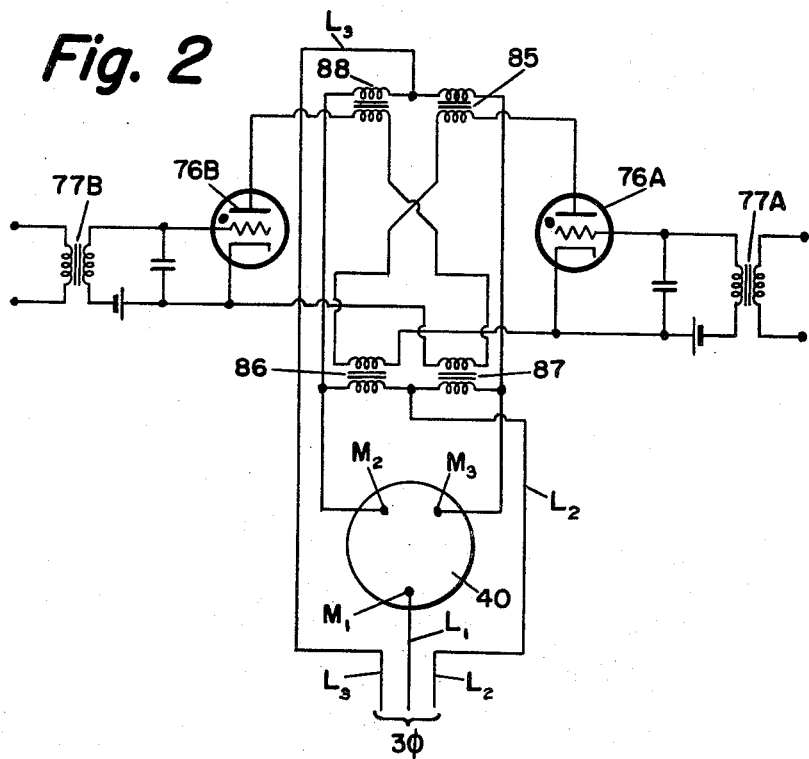
Figure 3:
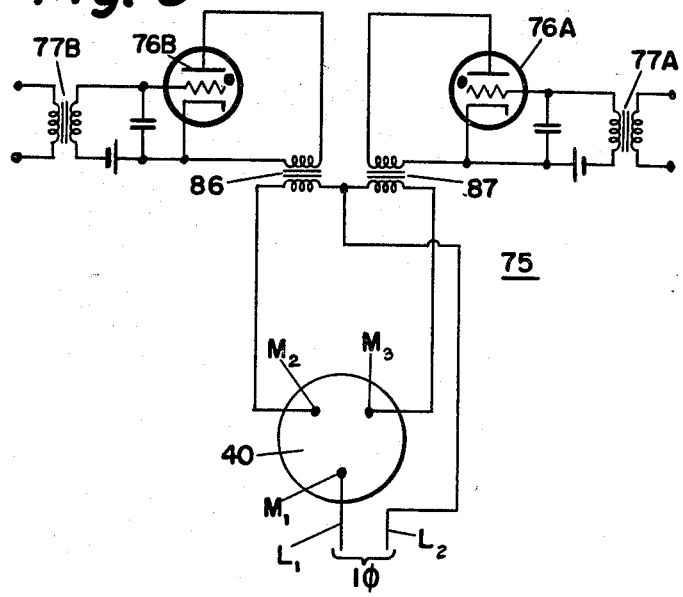

For a more detailed understanding of the invention, reference is made in the following description to the accompanying drawings in which:

FIG. 1 schematically illustrates a control system embodying the invention;

FIG. 2 is a detailed view schematically showing part of the motor control circuit of FIG. 1 redrawn for explanatory purposes; and FIG. 3 illustrates the motor control circuit of FIG. 2 as used for a single-phase supply source.

In the drawings, FIG. 1 schematically shows a preferred embodiment of the invention as used to control the pressure of the combustion chamber of a steam generator 10 by varying the amount of air supplied for combustion. The controlled process variable is furnace pressure and the final control element is a damper valve 18 adjustable to vary the amount of air supplied to the inlet of a blower or forced draft fan 16 driven by motor 17 for a given load on the steam generator. The stack fan 16A is driven by motor 17A whose speed is changed in response to changes in load upon generator 10 by control means not shown and not forming part of the present invention.

The pressure-responsive device 11 shown includes a diaphragm 12, one side of which is subjected to the furnace pressure. The diaphragm is mechanically coupled to a lever 13 to effect movement in one direction upon fall of furnace pressure and in opposite direction upon increase of furnace pressure. To establish a fixed reference position for lever 13 corresponding with a desired furnace pressure, one end of a loading spring 14 is connected to lever 13 and the other end of the spring is adjustably anchored to the movable element of a traveling nut mechanism. By adjusting the knob 15 of this mechanism, the lever 13 will be in such reference position when the furnace pressure corresponds with the desired pressure or set point as indicated on scale 8.

To convert the deviations in furnace pressure from the desired control point, as set by knob 15 or equivalent, into electrical signals, the movable core 20 of a differential transformer 19 is mechanically coupled to the lever 13 of the pressure-responsive device 11. With the lever 13 in the reference position, the core 20 is so positioned that the voltages induced in the opposed secondary windings 22A, 22B from the primary winding 21 of transformer 19 are equal and opposite. For pressures above or below the set point, the net output voltage of the transformer 19 is of one phase or the other depending upon the sense of the pressure deviation and the magnitude of such voltage depends upon the magnitude of the pressure deviation.

The A.C. output voltage of the transducer 19 is impressed upon the signal input terminals 28A, 28B of a demodulator network 23 to produce a direct-current (D.C.) voltage of magnitude corresponding with the magnitude of the pressure deviation from the set point and of polarity corresponding with the sense of such deviation. Specifically, the demodulator 23 comprises four diodes 24A–24D arranged in the form of a bridge network and poled as indicated. The power input terminals 27A, 27B of the demodulator bridge are connected to the secondary winding of a power transformer 25 supplied from the same source of alternating current as the primary winding 21 of the differential signal transformer 19. When the double-differentiation, later described, is to be used, the frequency of this source should be substantially higher than the usual power-line frequency; a frequency of 700 cycles per second has been used. The capacitor 26, or equivalent phasing element, is included in the supply circuit for the demodulator.

When the signal voltage applied to the input terminals 28A, 28B of the demodulator is zero, the A.C. currents supplied by the power transformer 25 for the alternate half-cycles are of equal magnitude, and the direct-current output of the demodulator appearing between terminal 28B and conductor 9 is zero. If, however, the furnace pressure is above or below the set point, there appears between the terminal 28B of the demodulator and the conductor 9 a direct-current voltage in sense and magnitude corresponding with the pressure deviation. The ripple component of the D.C. output of the demodulator 23 is smoothed by the filter network comprising the resistor 30 and the capacitors 31A, 31B.

The smoothed direct-current output of the filter 29 is applied to a potential-dividing network including the slidewire 35 and the end coils 34A, 34B. By adjustment of the contact 36 of the slidewire 35, any preselected percentage of the direct-current output of the demodulator 23 may be supplied to a suitable averaging or summing device or network 38.

This control signal, as will now be explained, is combined in the summing network 38 with a feedback-signal proportional to the rate of change of position of the damper valve 18. The motor 40 for adjusting the damper valve 18 is also coupled to a direct-current tachometer 42 connected in series with a slidewire 43 to form a circuit 41 in which the current flow corresponds with the direction and speed of adjustment of the damp 18. By adjustment of the contact 44 of slidewire 43, any preselected percentage of the output of the tachometer generator 42 may be supplied to the summing network 38 as a feedback signal. The feedback loop from the tachometer circuit 41 includes a lead network 45 comprising the resistor 46 and capacitor 47 for dynamic stability of the motor-tachometer-control loop.

In the specific form of summing device 38 shown, the resistors 39A and 39E, respectively connected to the contacts 36 and 44 of slidewires 35 and 43, have their common terminal connected to the output terminal or summing point 38A of the summing device 38. In the arrangement as thus far described, when the control signal from network 33 (corresponding with the existing pressure deviation) is equal and opposite to the feedback signal from network 41 (corresponding with the rate of change of position of valve 18), the output voltage of the summing network 38, as appearing between terminal 38A and the conductor 9, is zero. If the control signal and the feedback signal are not equal, the D.C. voltage appearing between terminal 38A and conductor 9 is of sense and magnitude corresponding with the difference between the control and feedback signals.

This difference voltage, as will now be explained, is used to control the energization of valve motor 40. Such voltage is converted, as by a synchronizing switch 48, into an alternating input voltage for amplification by the amplifier 55 which may be of the type shown in U.S. Letters Patent 2,797,291. Specifically, the synchronizing switch 48 comprises a coil 49 excited from a source of alternating current and mechanically coupled to movable switch contact 50 which alternately engages the fixed contacts 51A, 51B respectively connected to conductor 9 and output terminal 38A of the summing network 38. Preferably and as shown, the connections to the synchronizing switch 48 from the summing device 38 include a decoupling network 52 including the series resistor 53 and the shunt capacitor 54.

The amplifier output circuit includes two relays 56A, 56B, one of which is energized when the output of the summing device 38 is of one polarity, and the other of which is energized when the output of the summing device 38 is of opposite polarity. These relays may be of the electromagnetic type as shown, or they may be small thyratrons. These direction-relays are used, as later more fully described, to control the sense of energization of the damper motor 40. If the speed of motor 40 is excessive for the existing pressure deviation, one or the other of the direction-relays 56A, 56B is effective to reverse the excitation of the motor 40 until its speed falls to the extent that the feedback signal balances the control signal. If, on the other hand, the speed of adjustment of valve 18 is lower than suited for the existing pressure deviation, the other direction-relay is effective to excite motor 40 in sense to increase its speed.

As thus far described, the rate of change of position of the damper 18 is balanced against the existing deviation of the furnace pressure from the set point. In other words, so long as the pressure deviation is not changing, the actuating motor 40 of the final control element, valve 18, runs at constant speed.

Upon this control action may be superimposed a second control action which recognizes the rate or speed at which the pressure deviation may be increasing or decreasing. With the switch 61 closed, the direct-current output of the demodulator network 23 is impressed upon a differentiating circuit 57 including the capacitor 58 and the slidewire 59. The magnitude of the current flowing through this network, and, therefore, the voltage drop across the resistor 59, is a function of the rate of change of the furnace pressure. The control signal produced by the differentiating network 57 is supplied to the resistance 39B, or equivalent, of the summing or averaging device 38 for combination with the deviation or first control signal derived from the network 33 and with the feedback signal from network 41. By adjustment of the contact 60 of slideware 59, the magnitude of this second control signal for any given rate of change of pressure may be selected. Assuming that the only signals supplied to the summing device 38 are the second control signal from the differentiating network 57 and the feedback signal from the network 41, the control amplifier 55 has zero signal input when the speed of adjustment of the damper valve 18 is proportional to the rate at which the furnace pressure is changing.

With switch 61 open and switch 70 closed, the direct-current output of the demodulator 23 is impressed upon a double differentiation network 63. The output signal is applied first to the branch comprising capacitor 64 and adjustable resistance 65 to produce across the selected portion of resistor 65 a voltage corresponding with the rate of change of furnace pressure. This voltage is applied to a second branch of the differentiating network comprising the capacitor 67 and the slidewire 68. The voltage across slidewire 68 therefore varies in accordance with the acceleration, or rate of the rate of change, of the pressure. This control signal is supplied to the resistor 39C or equivalent of the summing network 38. The magnitude of this signal for any given acceleration of the furnace pressure can be preset by knob 71 which is coupled to the adjustable contacts 66 and 69 of the slidewires 65 and 68 of the two branches of the differentiating network 63. Considering only this third control signal and the feedback signal from network 41, the output of the summing device 38 is zero when the valve speed is proportional to the deviation acceleration. In other words, the speed of the valve adjustment is zero when the previous deviation is changing at constant speed.

With the switch 91 in the full-line position shown, the output of network 38 is the algebraic sum of the feedback signal and the control signal or signals supplied to network 38 including any signal supplied, with switch 72 closed, to the resistor 39D and representative of some other process variable or disturbance which would affect the main control loop. Specifically, and as shown, there may be introduced into network 38 a signal produced by tachometer generator 42A driven by the stack-fan motor 17A.

The summation output voltage of network 38 is sampled for each cycle of movement of the synchronous switch contact 50 as it engages the upper switch contact 51B. In the interval between successive samplings, with switch 90 in full-line position shown, the input circuit of amplifier 55 is short-circuited by engagement of contacts 50 and 51A of the synchronous switch to discharge the input-circuit capacitor.

With the switches 90 and 91 in their dotted-line positions, the feedback signal is no longer introduced into network 38, but is supplied by way of conductor 92 to the lower contact 51A of synchronous switch 48. The polarity of the tachometer is reversed for this connection of the switches. In this case for each cycle of the synchronous switch, it alternately samples the feedback signal and the signal, or algebraic sum of the signals, supplied to network 38.

For either the full-line or the dotted-line position of the switches 90, 91 and with slidewire contact 44 readjusted, the net input to amplifier 55 is essentially identical for the same pressure-deviation and the same speed of adjustment of valve 18.

As indicated above, the direction-relays 56A, 56B are used to control the speed and direction of rotation of the motor 40. From the preceding description, it will be appreciated that the supply of current to the motor 40 may be cut off and on and reversed at short intervals in control of the motor speed for either direction of its rotation. Having in mind the large size of a damper motor for the steam generator of a turbo-alternator unit, it is not feasible to use the direction-relays 56A, 56B directly to control the motor circuit, nor is it satisfactory to use them in the usual relay-contactor arrangement. In the system shown in FIG. 1, the direction relays 56A, 56B are used selectively to supply direction-signals to a magnetic amplifier 75 including, for a three-phase supply source, four saturable core transformers 85–88 and two thyratrons 76A, 76B or equivalent solid-state rectifiers having control electrodes.

Terminal M–1 of motor 40 is connected to line L–1 of the three-phase source. As more clearly shown in FIG. 2, the primary windings of two of the saturable core transformers 86, 87 are connected in series between the other two terminals M–2 and M–3 of the motor and the common terminals of these primary windings are connected to line L–2 of the three-phase source. The primary windings of the other pair of saturable core transformers 85–88 are connected between the terminals M–2, M–3 of the motor, and the common terminal of this pair of primary windings is connected to the third line L–3 of the three-phase source. In absence of any direction-signal, the reactances of the primary windings of each pair are equal and consequently the motor terminals M–2, M–3 are at the same potential and the motor produces no torque.

The secondary or saturating winding of transformer 85 of the upper pair is connected in series with the secondary winding of the transformer 86 of the lower pair in the anode circuit of thyratron 76A. Similarly, the secondary winding of transformer 88 of the upper pair is connected in series with the secondary winding of transformer 87 of the lower pair in the anode circuit of thyratron 76B. In absence of a direction-signal to either thyratron, the voltages induced in the secondary windings do not produce flow of current and the reactances of each pair of adjacent primary windings remain high and balanced. The four primary windings form a normally balanced bridge.

Assuming a direction-signal is applied to the grid or control circuit of thyratron 76A, its anode circuit becomes conductive and the voltages induced in the secondary windings of transformers 85 and 86 are effective to produce flow of direct current which substantially reduces the reactance of the primary windings of the conjugate transformers 85 and 86. Thus, with the thyratron 76A firing, the line L–3 is effectively connected to motor terminal M–3 and the motor terminal M–2 is effectively connected to line L–2. The motor thereupon rotates in a corresponding direction.

The motor rotates in reverse direction if the direction-signal is applied to the grid or control electrode circuit of the other thyratron 76B. In this case, the voltage induced in the secondary windings of the other conjugate transformers 87 and 88 is effective to produce flow of direct current which saturates the cores of those transformers and substantially reduces the reactance of their primary windings. Thus, the terminal M–2 of the motor is now effectively connected to line L–3 and terminal M–3 of the motor is effectively connected to line L–2 for energization in the reverse sense. When the excitation signal to the thyratron is interrupted, the primary reactances return to their normal high values and supply of current to the motor is effectively cut off. The saturation effect persists for sufficient time, however, to provide for substantially full-wave power to the motor so long as a direction-signal is applied.

Reverting to FIG. 1, the grid or control circuits of the rectifiers 76A–76B respectively include the secondary windings of two small signal transformers 77A, 77B whose primary windings are connected to phase $L_2$, $L_3$ of the three-phase source which supplies motor 40. The primary windings of transformers 77A, 77B respectively include the contacts 81A and 81B of the direction-relays 56A, 56B. Thus, when the contact 81A of relay 56A completes the primary circuit of transformer 77A, the thyratron 76A receives a direction-signal, whereas when the contact 81B of relay 56B completes the primary winding of transformer 77B, the thyratron 76B receives a direction-signal. With the motor 40 at rest, these signals will effect rotation of the motor in one direction or the other as above described depending upon which of the direction-signals is applied; with the motor coasting, its effective torque will be increased or decreased depending upon the sense of the direction-signal.

As indicated, the control circuits of the thyratrons respectively include the sources 78A, 78B of D.C. biasing voltage to prevent the thyratrons from firing in absence of a direction-signal. The input circuits of the thyratrons also include capacitors 79A, 79B to prevent firing due to transients picked up by these circuits including transients due to the firing of the other tube.

When a single-phase supply source is used for motor 40, the magnetic amplifier 75 includes only a single pair of saturable core transformers 86, 87. As in FIGS. 1 and 2, the primary windings of these transformers are connected in series between the motor terminals M–2, M–3 and the common terminal of these windings is connected to line L–2. The terminal M–1 of motor 40 is connected as before to line L–1. Again, as in FIGS. 1 and 2, and in absence of any direction-signal, the reactances of the primary windings are large and in balance, the motor terminals M–2 and M–3 are of the same potential, and the motor produces no torque.

When the thyratron 76A is fired by a corresponding direction-signal, the voltage induced in the secondary winding of transformer 87 is effective to produce flow of direct current in the anode circuit of the thyratron. This current saturates the core of transformer 87, substantially reducing its primary reactance and so effectively connecting line L–2 to terminal M–3 of the motor because the reactance of the adjacent primary winding of reactor 86 remains high. If, on the other hand, the thyratron 76B is fired by a direction-signal, direct current flows in the anode circuit of that thyratron with a resultant saturation of the core of transformer 86. The consequent reduction of the reactance of the primary winding of transformer 86 effectively connects line L–2 to terminal M–2 of the motor 40 because the reactance of the adjacent primary winding of reactor 87 remains high.

In the system of FIG. 1 as thus far described, the motor 40 is automatically controlled in response to deviations of a process variable from a set point. In starting up or under unusual operating conditions, it is desirable that the damper motor 40 be placed under manual control. To that end, the input circuits of the transformers 77A, 77B respectively include the switches 80A, 80B which are in the full-line position shown for Automatic control of motor 40. When these switches are thrown as by knob 83 to the Manual or dotted-line position, the connections from the primary windings of transformers 77A, 77B are transferred from the direction-relay contacts to the push-buttons 82A, 82B respectively. Thus, an operator may control the direction and speed of rotation of motor 40 in manner appropriate for the then existing conditions. The transfer from Manual to Automatic control, or vice versa, does not require the operator to make any adjustments in the Automatic control system. The transfer inherently does not produce any "bump" in the control action since the final control element has no fixed reference position. It is also to be noted that when the process variable is steady at the set point, any one or more of the sidewires 35, 43, 59, 65 and 68 may be adjusted without affecting the damper motor 40.

What is claimed is:

1. An automatic control system comprising means responsive to the deviations of a condition from a desired magnitude thereof for producing a first electrical signal in sense and magnitude corresponding with the existing deviation, a control element adjustable through a range of positions for changing a process variable affecting the magnitude of said condition, a reversible motor for adjusting said control element, a tachometer generator driven by said motor for producing a second electrical signal in sense and magnitude corresponding with the direction and rate of change of position of said control element, means for combining said electrical signals to produce a resultant electrical signal of sign dependent upon the magnitude and sign of said first and second signals, a pair of direction-relays selectively energized in dependence upon the sign of said resultant signal, a magnetic amplifier comprising saturable core transformers having primary windings in circuit with said motor and its A.C. power source, and controlled rectifiers having output circuits including the secondary windings of said transformers and having input circuits selectively excited by said direction-relays to unbalance the reactances of said primary windings and so effect energization of said motor in accordance with said resultant electrical signal.

2. A control system for maintaining the magnitude of a condition at a set point comprising a control element adjustable through a range of positions to vary the magnitude of said condition, means for producing a feedback signal in sense and magnitude corresponding with the direction and speed of adjustment of said element, means for producing a first control signal in sense and magnitude corresponding with the deviation in magnitude of said condition from the set point, means for differentiating said first control signal at least once to produce a second control signal, summation means in which said feedback signal is combined with said control signals to produce direction-signals, reversible motor means normally energized in accordance with said direction-signals for automatically adjusting said control element in a direction and at a speed determined by them, switching means in the control circuit of said motor normally in position for automatic control of said motor means by said direction-signals and operable to another position for manual control of said motor means, and manually-operable switches selectively operable for said other position of said switching means to energize said motor means in one direction or the other to change the position of said control element, the transfer from automatic to manual control and vice versa being bumpless.

References Cited in the file of this patent
UNITED STATES PATENTS

| | | |
|---|---|---|
| 2,446,567 | White et al. | Aug. 10, 1948 |
| 2,525,967 | Smoot | Oct. 17, 1950 |
| 2,534,293 | Newton | Dec. 19, 1950 |
| 2,550,569 | Lamm et al. | Apr. 24, 1951 |
| 2,608,676 | MacCollum et al. | Aug. 26, 1952 |
| 2,626,767 | Bromley | Jan. 27, 1953 |
| 2,632,872 | Warsher | Mar. 24, 1953 |
| 2,654,999 | Berge | Oct. 13, 1953 |
| 2,830,245 | Davis et al. | Apr. 8, 1958 |
| 2,917,694 | Ashcroft | Dec. 15, 1959 |

OTHER REFERENCES

Ahrendt, W. R.: Servomechanism Practice, page 120, Fig. 8-5; McGraw-Hill, New York, 1954.

Feedback Control System; Gille, Pelegrin, Decauline, McGraw-Hill Book Co., Inc., 1959. Chapter 18 relied upon.